United States Patent [19]

Battjes et al.

[11] 4,039,899
[45] Aug. 2, 1977

[54] GEOMETRY AND FOCUS CORRECTION CIRCUIT

[75] Inventors: Carl Robert Battjes, Portland; Harvey Leon Golladay, Beaverton; Michael Lawrence Rieger, Tigard; Binoy Anthony Rosario, Aloha; Kenneth George Schlotzhauer, Beaverton, all of Oreg.

[73] Assignee: Tektronix, Inc., Beaverton, Oreg.

[21] Appl. No.: 682,242

[22] Filed: May 3, 1976

[51] Int. Cl.² .......................................... H01J 29/56
[52] U.S. Cl. .................................................. 315/371
[58] Field of Search ....................... 315/370, 371, 393

[56] References Cited
U.S. PATENT DOCUMENTS

| 3,517,252 | 6/1970 | Williams | 315/371 |
| 3,772,566 | 11/1973 | Schwartz | 315/370 |
| 3,825,796 | 7/1974 | Bello | 315/370 |

Primary Examiner—Maynard R. Wilbur
Assistant Examiner—T. M. Blum
Attorney, Agent, or Firm—George T. Noe

[57] ABSTRACT

A circuit to correct for pincushion distortion and defocusing in a cathode-ray tube having electromagnetic deflection systems is disclosed. The circuit, which may be realized in monolithic integrated-circuit form, performs a mathematical function to predistort the deflection signal for each axis by the amount necessary to provide an undistorted display. The circuit also provides a signal to correct for the defocusing that occurs at the edges of the screen. The circuit may be readily adapted for use with cathode-ray tubes having different diagonal deflection angles, and with either flat or curved faceplates, by changing the values of two resistors.

14 Claims, 4 Drawing Figures

GEOMETRY AND FOCUS CORRECTION CIRCUIT

BACKGROUND OF THE INVENTION

The present invention relates to cathode-ray tube circuits in general, and in particular to a geometry and focus correction circuit for a cathode-ray tube having an electromagnetic deflection system.

In a cathode-ray tube, hereinafter abbreviated CRT, having an electromagnetic deflection system, the relationship between deflection current through the deflection yoke and spot deflection over CRT faceplate is non linear principally as a result of two geometrically related phenomena. First, for electromagnetic deflection the sine of the angle $\theta$ of deflection is proportional to deflection current, or $\sin \theta = kI$. Second, the CRT faceplate is either flat or only partially curved rather than being spherical with the radial origin coincident with the point of beam deflection. Assuming observation from an infinite view point, a display image which is intended to be linear appears to be bowed toward the center of the screen. Such distortion is commonly referred to as pincushion distortion.

In addition to geometry distortion, defocusing of the spot occurs at the outer edges of a CRT display because the beam distance from the point of deflection to the faceplate varies as the beam moves away from the center of the screen. This is due to the electron velocity remaining constant after deflection and the focus point being at a fixed total path distance as the electron moves toward the screen.

Previous attempts to correct for pincushion distortion have included optical faceplate lenses, magnetic devices, and wave-shaping techniques. One of the most widely used correction methods is predistortion of the positioning signals, as the other methods are generally expensive, inflexible, and have a tendency to create other problems, such as non linearities.

A detailed analytic treatment of the predistortion required for correction of pincushion distortion was given by A. E. Popodi, "Linearity Correction for Magnetically Deflected Cathode-Ray Tubes," EDN Magazine, January 1964, pages 124–139. Popodi noted that if the deflection angle is known, the error in spot deflection may be determined. While providing mathematical equations describing pincushion distortion and the correction required, Popodi suggests a complex circuit comprising many diodes and resistors which provides a piece-wise linear approximation of the correction function. Subsequent investigators have suggested series-expansion approximation and complex circuits including analog-to-digital circuits to provide an approximation of the correction function.

SUMMARY OF THE INVENTION

According to the present invention, a circuit is provided to generate predistorted X and Y deflection signals to correct for pin-cushion distortion of a CRT having an electromagnetic deflection system. The predistortion generated is proportional to the cosine of the deflection angle formed by the axis of the electron beam with respect to the center axis of the CRT.

The absolute values of the X and Y deflection voltages are converted to current levels proportional thereto and applied to a root-law circuit together with a reference current which is proportional to the length of the center, or Z, axis of the CRT between the point of deflection and the screen. The root-law circuit generates a current proportional to the square root of the sum of the squares of the input currents, or $3I_L = 3(I_x^2 + I_y^2 + I_z^2)^{1/2}$. The value of $I_L$ is immediately recognizable as being geometrically proportional to the length of the CRT electron beam between the point of deflection and the screen, and is the denominator of the predistortion equation.

The current $3I_L$ is split into three equal parts by a current division circuit for use in X and Y variable-gain deflection amplifiers and a focus output amplifier.

Each variable-gain deflection amplifier includes an emitterdegenerated input pair driving a linear transconductance multiplier, which produces a differential current to be converted to a deflection voltage by an amplifier with active feedback. The gain of each deflection amplifier is $I_z/I_L$, which by definition is proportional to the cosine of the deflection angle $\theta$. Since $\cos \theta$ is effectively the correction factor, $\sin \theta = (\cos \theta)kI$, or $\tan \theta = kI$, which is the linear equation for an undistorted display.

The focus output amplifier generates a correction voltage which is proportional to the beam length to be applied to the system focus circuitry which controls the focusing electrode of the CRT.

The correction signals generated in the foregoing manner apply equally well to the curved-faceplate case by selecting suitable current values.

The circuitry involved is relatively simple, and may be realized in monolithic integrated-circuit form.

It is therefore one object of the present invention to provide a novel geometry and focus correction circuit for cathode-ray tubes having electromagnetic deflection.

It is another object to provide a circuit which performs the required mathematical function to predistort deflection signals in an electromagnetic deflection system to provide an undistorted display.

It is a further object to provide a geometry and focus correction circuit which readily may be adapted to cathode-ray tubes having either flat or curved faceplates and differing diagonal deflection angles.

It is an additional object to provide a geometry and focus correction circuit which may be realized in monolithic integratedcircuit form.

This invention is pointed out with particularity in the appended claims. A more thorough understanding of the above and further objects and advantages of this invention may be obtained by referring to the following description taken in conjunction with the accompanying drawings.

DRAWINGS

DETAILED DESCRIPTION OF THE INVENTION

Figure 1:
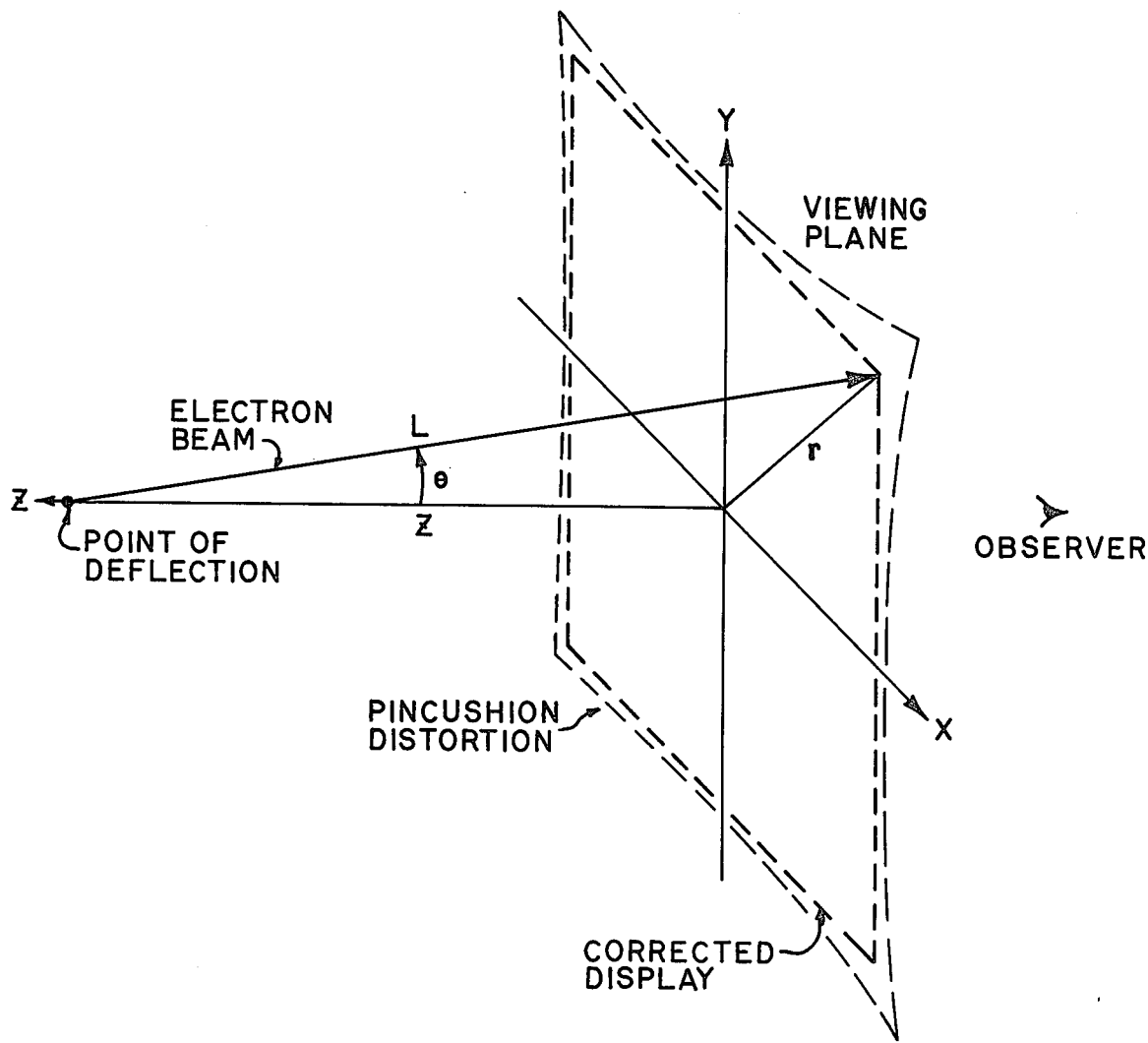
FIG. 1 shows a Cartesian coordinate system representing the electron-beam field of a cathode-ray tube.

With reference to FIG. 1 of the drawings, a Cartesian coordinate system is shown having orthogonal X, Y, and Z axes which represent respectively the horizontal, vertical, and longitudinal center axes of a cathode-ray tube. The X-Y plane represents the CRT screen, or viewing plane. An electron beam is shown as a vector L between a point of deflection and the viewing plane, and forms an angle $\theta$ with the Z axis.

In electromagnetic deflection systems, $\sin \theta$ is proportional to the input signal, or $$\sin \theta = kI \tag{1}$$

where $k$ is a deflection constant and $I$ is deflection current derived from the input signal. The actual deflection is the distance $r$ in the X-Y plane, and the non-linear transfer function is $$r = L \sin \theta = kI \sqrt{Z^2 + r^2} . \tag{2}$$

The predistortion or non-linear attenuation required to correct equation (2) must be proportional to the reciprocal of L, or $$\cos \theta = \frac{Z}{L} = \frac{1}{\sqrt{1 + \left(\frac{X}{Z}\right)^2 + \left(\frac{Y}{Z}\right)^2}} . \tag{3}$$

Equation (3) is mathematically the same for a flat screen as that set forth by the aforementioned Popodi, or $$\cos \theta = \frac{1}{\sqrt{1 + p^2 \tan^2 \alpha_{max} + q^2 \tan^2 \beta_{max}}} , \tag{4}$$

where $p$ and $q$ are the fractional uncorrected X- and Y-axis input signals respectively for $0 \leq (p, q) \leq 1$, and $\alpha_{max}$ and $\beta_{max}$ are the maximum deflection angles for the X and Y axes respectively.

Since $\cos \theta$ is the desired correction factor, the linear relationship becomes $\sin \theta = kI \cos \theta$ or $\tan \theta = kI$, which is analogous to the relationship for electrostatic deflection systems and is distortion free. The transfer function, then, is $$r = kZI. \tag{5}$$

The foregoing analysis for geometry correction is predicated on the assumption that the point of deflection is stationary and that the viewing plane is viewed from an infinitely distant point. Further, the output $r$ has been treated as the vecttor sum of the X- and Y-axis signals and therefore the attenuation of equations (3) and (4) must be applied to each axis.

The length of the electron beam from the point of deflection to the viewing plane is $$L = Z \sec \theta = Z \sqrt{1 + p^2 \tan^2 \alpha_{max} + q^2 \tan^2 \beta_{max}}. \tag{6}$$

It can be seen that the term under the radical sign is the same as that set forth in the denominator of equation (4). Therefore, this portion of the equation may be utilized to facilitate dynamic focus correction of the spot produced by the electron beam.

Substituting electrical values $I_x$, $I_y$, and $I_z$ for the geometrical values X, Y, and Z respectively, equations (3) and (4) may be rewritten as $$\cos \theta = \frac{Z}{L} = \frac{1}{\sqrt{I_z^2 + I_x^2 + I_y^2}} = \frac{1}{\sqrt{1 + p^2 \left(\frac{I_{x,max}}{I_z}\right)^2 + q^2 \left(\frac{I_{y,max}}{I_z}\right)^2}}, \tag{7}$$

where $I_z$ is a reference current proportional to Z.

Figure 2:
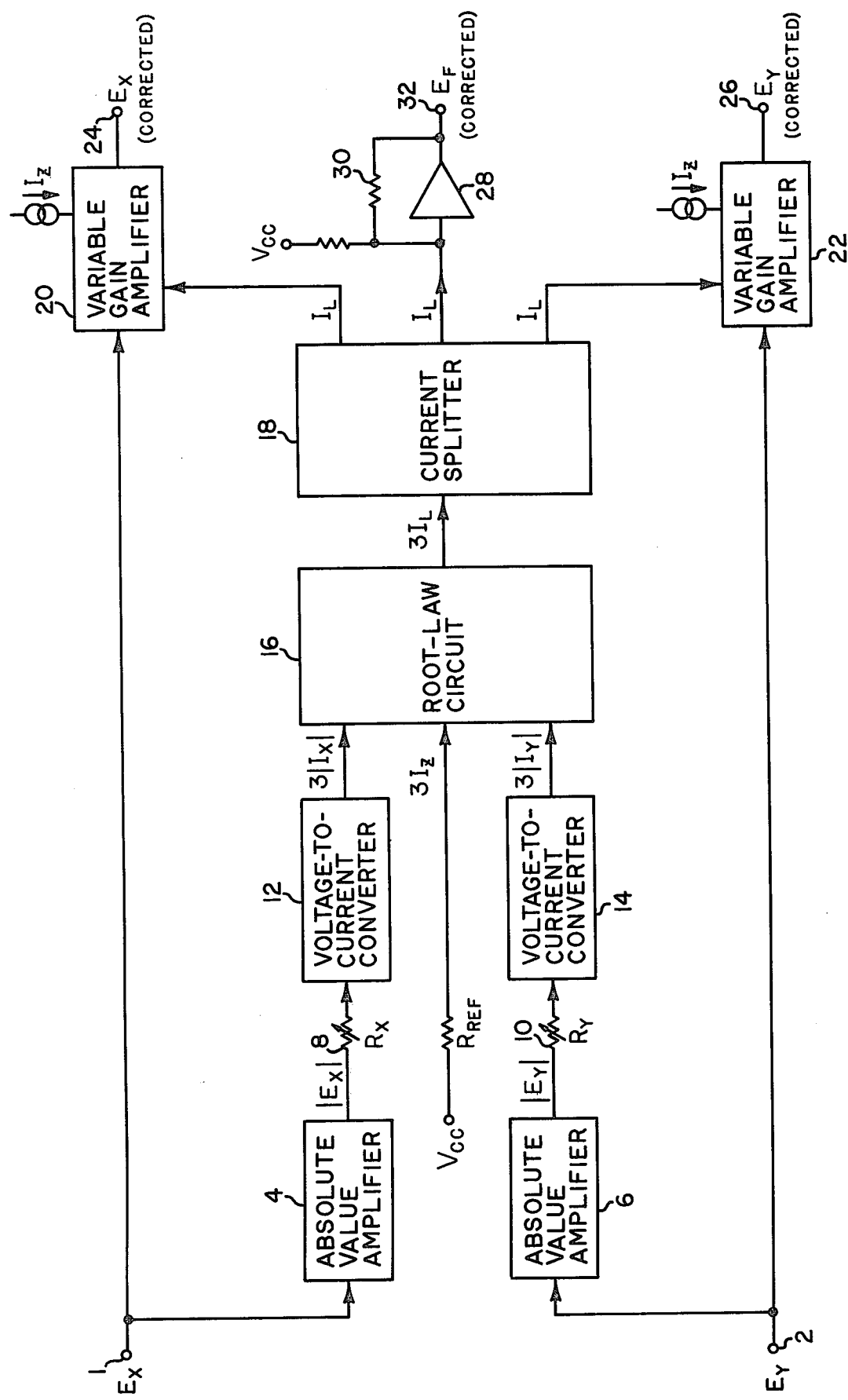
FIG. 2 shows a block diagram of a geometry and focus correction circuit according to the present invention.

FIG. 2 shows a block diagram of a geometry and focus correction circuit in accordance with the present invention. Input deflection voltages $E_x$ and $E_y$ are applied to input terminals 1 and 2 and are converted to absolute value voltages $|E_x|$ and $|E_y|$ by absolute value amplifiers 4 and 6 respectively. Amplifiers 4 and 6 may be any of the well-known absolute value circiuts available, such as those employing full-wave rectification about a reference level to provide a voltage magnitude irrespective of the polarity thereof.

The absolute value voltages are applied via adjustable resistors 8 and 10 to voltage-to-current converter circuits 12 and 14 respectively, to produce current values $3 |I_x|$ and $3 |I_y|$ which are proportional to $|E_x|$ and $|E_y|$ respectively. These current values, together with a reference current $3 I_z$, are applied to a root-law circuit 16, which in turn generates a current $3 I_L$ equal to the square root of the sum of the squares of the input currents, or $$3 I_L = 3 \sqrt{I_z^2 + I_x^2 + I_y^2}. \tag{8}$$

The output current $3 I_L$ is split into three equal portions by a current splitter circuit 18, each value of $I_L$ being equal to the denominator of equation (7).

A pair of variable gain amplifiers 20 and 22 provide a corrected amplification of the input signals $E_x$ and $E_y$ respectively. The gain of these amplifiers is determined by the ratio of $I_Z/I_L$, or $\cos \theta$. The corrected voltage outputs are available via output terminals 24 and 26 for use by the horizontal (X) and vertical (Y) deflection coils respectively. Since the deflection voltages are dynamically corrected in accordance with equation (7) as the deflection angle $\theta$ changes, an undistorted orthogonal display results.

The remaining quantity of $I_L$ is applied to an operational amplifier 28 and feedback resistor 30 to correct for defocusing caused by changes in CRT electron beam length. The corrected focusing voltage $E_f$ is made available via output terminal 32 to the system focus circuitry which controls the focusing electrode of the CRT.

The entire circuit hereinabove described suitably may be realized in monolithic integrated-circuit form. By changing resistance values of resistors 8 and 10, the circuit readily may be adapted for use with cathode-ray tubes having different deflection angles and aspect ratios. Additionally, a predistortion in the form of equation (7) is appropriate for the general case of a tube having a curved faceplate if $I_{x,max}/I_z$ and $I_{y,max}/I_z$ are suitably chosen. Further, in the case of a tube having a spherical faceplate whose radial center coincides with the point of deflection, equation (7) holds because the ratios $I_{x,max}/I_z$ and $I_{y,max}/I_z$ are equal to zero.

Figure 3:
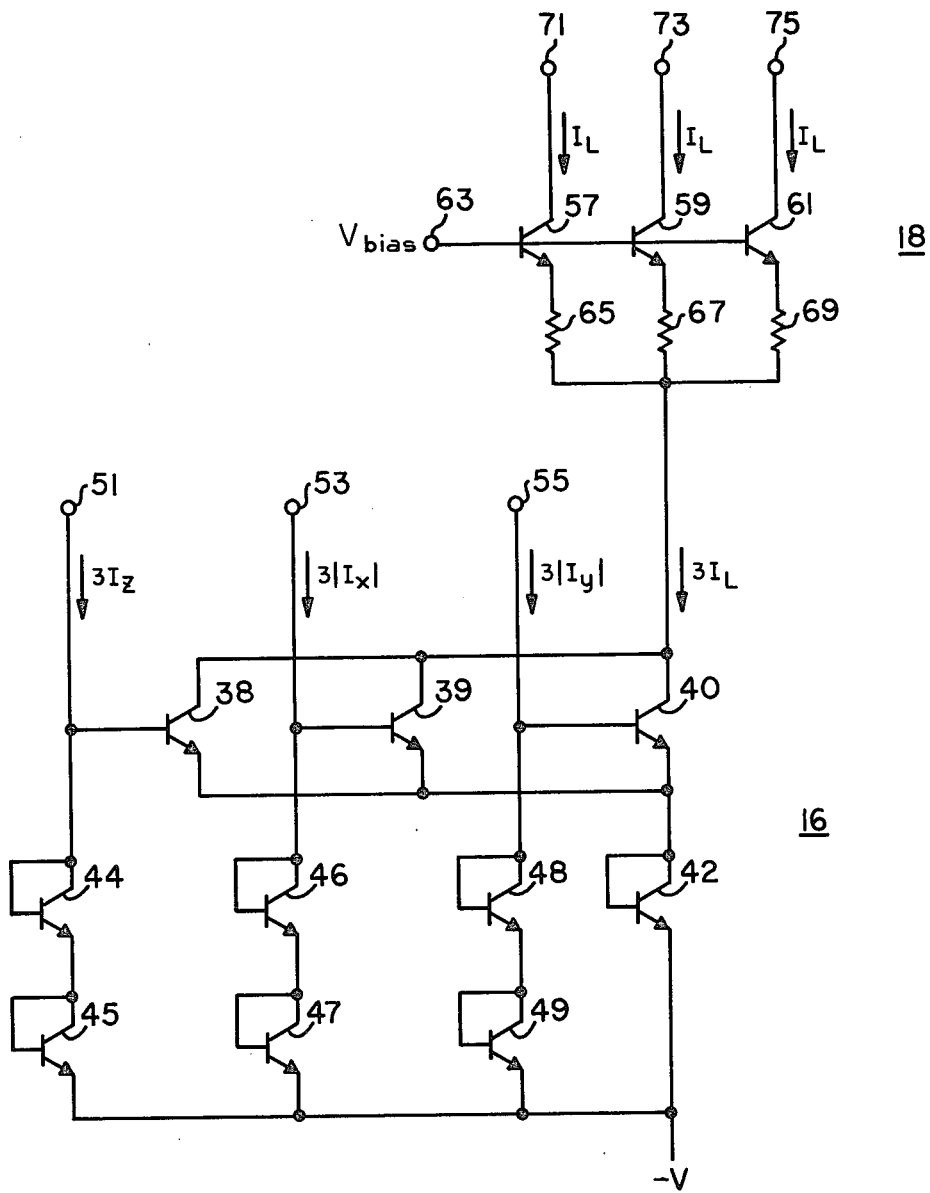
FIG. 3 is a detailed schematic of the root-law circuit portion of the circuit of FIG. 2.

The details of the root-law circuit 16 and current splitting circuit 18 are shown in FIG. 3. The root-law circuit comprises emittercoupled transistors 38, 39, and 40, emitter diode 42, and base diodes 44–49. This configuration is well known in the art, and an example may be found in "Electronic Letters," Volume 10, No. 21, pages 439 and 440. The reference current 3 $I_z$ is applied to terminal 51, while the absolute value currents from converters 12 and 14 are applied to terminals 53 and 55 respectively. The base voltage values of transistors 38, 39, and 40 with respect to a negative voltage -V are generated in accordance with logarithmic characteristics of the semiconductor diode junctions. The combined collector current for transistors 38, 39, and 40 is equal to 3 $I_L$ as set forth in equation (8). Integrated-circuit techniques permit the characteristics of these transistors and diodes to be closely matched to minimize error between the inputs and outputs.

The output current 3 $I_L$ is split into three equal portions by matched transistors 57, 59, and 61. These transistors are biased by a suitable bias voltage applied to the bases thereof via terminal 63 and equal valued emitter resistors 65, 67, and 69. The equal values of $I_L$ are made available to the variable-gain amplifiers 20 and 22 and the focus correction amplifier via terminals 71, 73, and 75 respectively.

Figure 4:
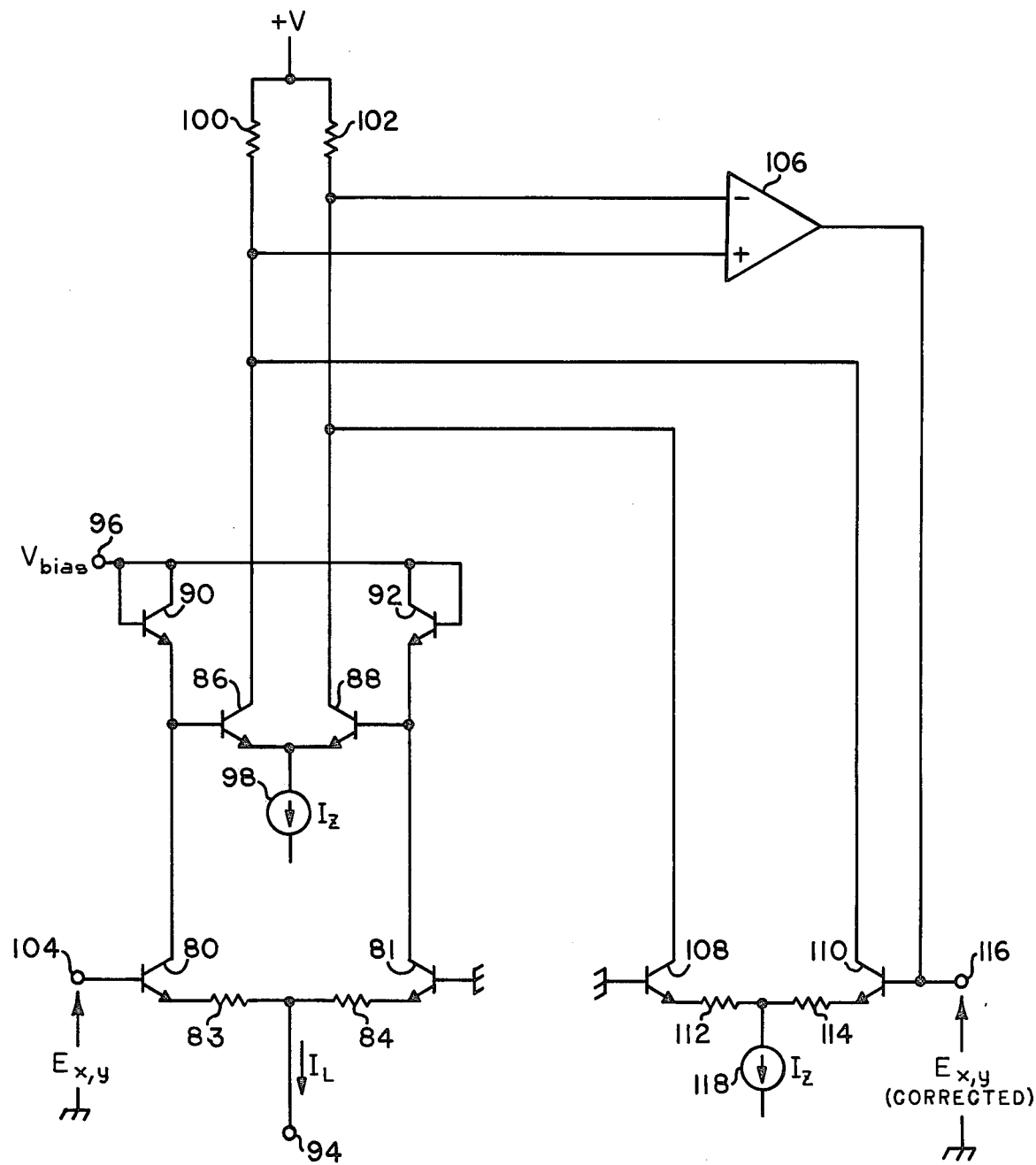
FIG. 4 is a detailed schematic of the variable-gain amplifier portion of the circuit of FIG. 2.

A detailed schematic of the variable-gain amplifiers of blocks 20 and 22 of FIG. 2 is shown in FIG. 4. The circuits for both the X and Y axes are identical, therefore the description is applicable to both amplifiers, and consequently the input and output voltage references include both the X and Y subscripts.

Transistors 80 and 81 are differentially connected through emitter resistors 83 and 84 to provide an emitter-degenerated input pair which drives a linear transconductance multiplier comprising differentially-connected transistors 86 and 88 and linearizing base diodes 90 and 92. The junction of resistors 83 and 84 may be connected to the collector of any of the transistors of the current splitting circuit 18 via terminal 94 to permit application of the quantity $I_L$. A source of bias voltage is connected to terminal 96, and a constant current source 98 is provided for the multiplier transistors 8 and 88. The current provided by current source 98 is equal to $I_z$. The collectors of transistors 86 and 88 are connected to a suitable source of positive voltage through collector load resistors 100 and 102.

The uncorrected input deflection signal is applied to an input terminal 104. The differential current produced at the collectors of transistors 86 and 88 is applied to high-gain differential amplifier 106 and to an emitter-degenerated differential feedback amplifier comprising transistors 108 and 110 which are emitter coupled via resistors 112 and 114 to produce a corrected single-ended output voltage at terminal 116. The transfer function of this circuit is $$\frac{E_{x,y(corrected)}}{E_{x,y}} = \frac{I_z}{I_L} = \cos \theta. \tag{9}$$

Thus, the output voltage at terminal 116 for application to the appropriate X or Y deflection coil is the desired predistorted deflection signal necessary to produce a distortion-free orthogonal display.

A constant current source 118 produces a current equal to $I_z$ for operation of amplifier 108-110. This amplifier has large-signal distortion characteristics similar to the input emitter-degenerated amplifier 80-81 and serves to substantially cancel this distortion. The resistance values of resistors 83, 84, 112, and 114 are preferably chosen to be equal.

While we have shown and described herein the preferred embodiment of our invention, it will be apparent to those skilled in the art that may changes and modifications may be made without departing from our invention in its broader aspects.

We claim:

1. A geometry and focus correction circuit for a cathode-ray tube having a focus electrode and a magnetic deflection system for deflecting an electron beam across a display target in response to vertical and horizontal deflection signals, comprising:

first and second input terminals for receiving said vertical and horizontal deflection signals, respectively;

reference generator means for providing an electrical quantity proportional to the axial length of said cathode-ray tube between said deflection system and said display target;

correction generator means responsive to said vertical and horizontal deflection signals and said reference quantity for generating a correction signal proportional to the length of said electron beam between said deflection system and said display target regardless of the angle of deflection thereof; and variable-gain amplifier means coupled to said input terminals for providing corrected vertical and horizontal deflection outputs, said deflection amplifier means being responsive to said electrical quantity and said correction signal for establishing the gain factor thereof wherein said gain factor is equal to the cosine of said deflection angle.

2. A circuit according to claim 1 where said correction generator includes a pair of absolute voltage circuits and a pair of voltage-to-current converters for converting said vertical and horizontal deflection signals to absolute current signals, and a square-law circuit for providing a correction current proportional to the square root of the sum of the squares of said current values and said electrical quantity.

3. A circuit according to claim 2 further including current adjustment means to adjust said absolute current signals to provide correction for cathode-ray tubes having different faceplate shapes.

4. A circuit according to claim 3 where said current adjustment means comprises first and second resistors having selectable predetermined resistance values.

5. A circuit according to claim 1 wherein said variable gain amplifier means includes vertical and horizontal deflection amplifiers, each of said amplifiers comprising an input differential amplifier whose common emitters are driven by said correction signal, a multiplier circuit connected to said differential amplifier for multiplying the output of said differential amplifier by said reference quantity, and a feedback amplifier connected to said multiplier to provide a voltage output.

6. A circuit according to claim 1 further including means for coupling said correction signal to said focus electrode.

7. A circuit to correct for pincushion distortion in a cathode-ray tube having an electromagnetic deflection system axially disposed a distance Z from a viewing screen, comprising:

a pair of input terminals for receiving X and Y deflection signals;

means for producing a Z reference quantity proportional to said distance Z;

means for receiving said X and Y deflection signals and said Z reference quantity and producing therefrom a correction signal proportional to $\sqrt{X^2 + Y^2 + Z^2}$; and amplifier means for receiving said X and Y deflection signals, said Z reference quantity, and said correction signal for producing predistorted X and Y deflection signal outputs, wherein said predistortion is proportional to $Z \mid \sqrt{X^2 + Y^2 + Z^2}$.

8. A circuit according to claim 7 wherein said means for producing a correction signal includes means for converting said X and Y deflection signals and said Z reference quantities to currents $I_x$, $I_y$, and $I_z$ respectively wherein said correction signal is proportional to $\sqrt{I_x^2 + I_y^2 + I_z^2}$.

9. A circuit according to claim 8 wherein said currents $I_x$ and $I_y$ are selectable to provide correction signals for different shapes of cathode-ray tube viewing screens.

10. A circuit according to claim 8 wherein said amplifier means includes horizontal and vertical deflection amplifiers.

11. A circuit according to claim 10 further including a dynamic focus circuit for coupling said correction signal to a focus electrode of said cathode-ray tube.

12. A circuit according to claim 11 wherein said means for producing a correction signal further includes a square-law circuit and a current-splitting circuit for providing three equal values of correction signal current $\sqrt{I_x^2 + I_y^2 + I_z^2}$ for application to said horizontal and vertical deflection amplifiers and said dynamic focus circuit.

13. A circuit for providing linearity correction and dynamic focus correction to a magnetically deflected cathode-ray tube having X (horizontal) and Y (vertical) deflection signals applied thereto, said linearity correction being applied to horizontal and vertical deflection amplifiers coupled to the horizontal and vertical deflection yokes, respectively, of said cathode-ray tube to control the gain factor of said deflection amplifiers, said circuit comprising:

reference generator means for producing a reference current $I_z$ whose magnitude is proportional to the Z-axis distance between the cathode-ray tube point of deflection and display target;

means for converting said X and Y signals to currents $I_x$ and $I_y$ respectively; and root-law circuit means for providing three correction currents whose magnitudes are equal to the square root of the sum of the squares of $I_x$, $I_y$, and $I_z$.

14. A circuit according to claim 13 further including a focus correction amplifier for converting one of said correction currents to a focus voltage signal.

* * * * *